United States Patent Office 2,994,642
Patented Aug. 1, 1961

2,994,642
SODIUM CHLORIDE TOOTHPASTE HAVING A SILICA AEROGEL CARRIER
François Jean Bossard, 33 Boulevard Malesherbes, Paris, France
No Drawing. Filed Mar. 18, 1958, Ser. No. 722,143
Claims priority, application France Oct. 16, 1954
5 Claims. (Cl. 167—93)

This is a continuation-in-part of my earlier application Ser. No. 540,349, filed October 13, 1955, now abandoned.

This invention relates to tooth paste compositions in which the physiologically active agent consists of a concentrated sodium chloride solution and it has for its object to improve a tooth paste of this type with respect to its therapeutic effect, with respect to its keeping quality, with respect to its capability of maintaining itself free of microorganisms for exended periods, with respect to cleaning effectiveness and in a number of other ways.

In an earlier application, now Patent No. 2,658,851 issued to Jacques E. Brandenberger and myself, dated November 10, 1953, it was explained that the use of dentifrices based on a combined emulsifying and cleaning agent consisting of a surface tension lowering detergent has undesirable effects, because the lowering of the surface tension causes penetration of the detergent into the gum tissues. To avoid this deleterious effect the use of sodium chloride was suggested in the said earlier patent. By introducing into the paste a hypertonic solution of sodium chloride of a concentration considerably higher than the concentration in the body fluids an osmotic action is obtained, drawing fluids from the tissues outwardly, which permits to utilize the beneficial effects of the sodium chloride itself and those of the physiological process engendered by it in the tissues. Obviously the effect obtained depends, however, largely on the manner in which the sodium chloride is incorporated into the paste.

According to the said earlier patent the tooth paste was prepared as an emulsion, the continuous phase of which was formed by the hypertonic concentrated salt solution. As an emulsifying agent bentonite was used which, together with finely divided calcium carbonate or triphosphate, also formed the abrasive. The tonic action of a tooth past prepared in the manner indicated was proved by the therapeutic effect, exercised when using the paste as a therapeutic agent in cases of inflammatory diseases of the gingiva, a fact which soon found wide recognition (cf. Prof. Dr. Oscar Muller, Die Gingivitis und ihre Behandlung, Therapeutische Umschau 5, 185, 1949: Dr. Ernst Muller, Beitrag zur Gingitivitisbehandlung, Arbon 1952).

It was discovered, however, that the presence of bentonite in the paste entailed certain drawbacks and limitations. Bentonite is alkaline and therefore it was necessary to neutralize the paste in order to obtain the best effects. This entailed the introduction of inert substances without specific usefulness during the application of the paste. Further bentonite is a natural product, the composition and purity of which is somewhat dependent on the place of origin and which is therefore subject to variation. Its structure is essentially crystalline and it always contains some additions, usually sand, which are inseparable, but of a somewhat coarser structure, so that the activity of the bentonite as an emulsifier is frequently depressed. Further it contains spores and other microorganisms which are difficult to destroy. Its most serious defect is, as was found, the limiting effect it has on the percentage of sodium chloride solution which can be held within a stable paste.

While tests, experimentation and observation of the therapeutic action indicated that it was desirable to increase the tonic effect of the sodium chloride, the practical saturation of the solution in combination with the percentage of solution which a stable paste can hold with a neutral, finely dispersed emulsifier set an unsurmountable limit of around 10% of the weight of the paste on the quantity of sodium chloride which could be incorporated into a given quantity of the paste. Obviously the emulsifying capacity of the bentonite on which the stability of the paste depends had been utilized to the limit with this quantity.

A second important point connected with the composition of the tooth paste was introduced with the modern trend to produce tooth pastes which are free of microorganisms, and to maintain the tooth paste in this state until it reaches the consumer.

It had been found (cf. International Symposium: On the Prophylaxis of Dental Caries, Rome, March 1954, Report of Dres. Levi and Masini, published in Rivista Italiana di Stomatologia 1954, vol. 9, No. 9, pp. 1152–1157) that practically all tooth pastes which are commercially produced contain colonies of microorganisms, especially of the anaerobic type; gram positive and gram negative cocci, gram positive and gram negative bacteria, *Leptothricae vibrios* etc. have been specifically identified in all the numerous brands selected for the test. While most of these organisms are not considered as being pathogenic, they occur in some tooth pastes in very large numbers, and in any case they increase greatly the flora of microorganisms in the mouth and they thus indirectly increase the chances of an invasion by pathogenic microorganisms. As a consequence of this investigation, efforts have been made by several manufacturers to produce a tooth paste which is free from microorganisms. This is usually done by adding a disinfectant such as formaldehyde or the like, which expedient, however, introduces into the mouth and into the digestive tract foreign substances which, on account of the daily and continuous use are undesirable from a physiological standpoint. They are especially out of place where a biological product is desired with a therapeutic effect, based on an osmotic action which is counteracted by the protein precipitating and hardening action of such an addition.

It was found that the two problems of increasing the content of the tooth paste in salt solution and of obtaining a tooth paste which could be permanently kept free of microorganisms could be solved by binding the sodium chloride solution to an adsorptive biological substance of an extremely high adsorptive power, differing not only in degree but in quality from the absorptive power of merely finely divided or colloidal substances. To obtain a qualitatively different result the particle size of the adsorptive substance must be below $1/1000$ mm. that is below the microscopically detectable size and preferably below the wave length of visible light rays.

A biological substance is one not different from substances which occur naturally in the human body. A biological substance fulfilling the conditions with respect to particle size is for instance amorphous silica ($SiO_2$), precipitated from the gaseous phase at high temperature (around 1000° C.) with a particle size averaging about 4 to 20 millimicrons and containing around $11 \times 10^{15}$ particles per gram and with an active surface of around 175 m.$^2$ per gram. With a particle size of this magnitude amorphous silicon dioxide becomes a material with properties which are different from those of silicon dioxide in other forms.

Silica gel, for instance, a colloidal substance which is a most common form of silica is produced by precipitation from a liquid phase and shows a clearly visible and pronounced crystalline structure under the microscope. It always contains a percentage of impurities and its absorptive power is much inferior to that of amorphous silica precipitated from the gaseous phase at about 1000° C. Even under the electron microscope the latter shows no trace of a crystalline structure. A given volume may thus be enriched in active silicon dioxide to an extent which is quite out of proportion with the volume occupied by other forms of silicon dioxide.

Silica acid of this type is commercially available under the trade name "Aerosil" and is produced by the Degussa concern (Germany) and is referred to as silica aerogel in the United States. It has been subjected to many tests and was proved to be quite harmless and non-toxic, while most forms of silica are rated as toxic. Its pH is about 5.

With amorphous silica of this description and particle size a new kind of sodium chloride tooth paste can be produced which in its simplest form consists only of a concentrated sodium chloride solution adsorbed on a quantity of amorphous silica of a weight which is small when compared with the weight of the tooth paste. This makes the tooth paste particularly effective.

A main advantage gained over the known tooth pastes by the use of amorphous silica is the fact that no fat or oil or fatty material need be used. Such fatty materials are indispensable to produce an emulsion preventing water emigration from the crystalline material during protracted storage and to tone down the abrasive power of the crystalline substances used in the paste. However they lower the surface tension of the fluids with which they come into contact, which has an unfavorable effect on the tissues.

The most pronounced advantage of the use of the amorphous silica of the above stated particle size is the enriching of the paste in sodium chloride per unit weight. The content of the paste in salt solution when expressed in percent may now vary from 12.5 to 23%, and more, according to the purpose for which the tooth paste is compounded. This secures an osmotic and therapeutic effect which is more intensified in proportion than the increase in percent indicates as the osmotic action engendered by the salt solution increases rapidly with the increase of the concentration of the tonic substance within the mixture applied. In addition the amorphous silica itself, by virtue of its aborptive power, exercises a cleaning action by absorbing residual food particles, dead cells, bacteria, etc. The combined effect is thus a more complete removal of all potentially detrimental material.

This combined tonic and cleaning effect manifests itself in the markedly improved therapeutic effect in the event of inflammatory diseases of the gingiva. A tooth paste prepared with amorphous silica of the particle size above stated shows a marked depth action, an effect which can not be obtained with smaller concentrations within the limited time of applications of the paste. In many cases where an inflammation of a marginal portion of the gingiva is visible there are inflammation centers in the subepithelial tissues, which sometimes spread to the interdental bone septum. Sometimes the marginal inflammation center is due to more serious conditions below, and sometimes the marginal inflammation spreads to deeper layers. In both cases it is of importance to reach the subepithelial inflammation centers. This can be done by increasing the osmotic effect which produces an increased blood circulation to replace the fluid which has been extracted from the tissues. To obtain this effect on the tissues a threshold value must be reached which, as histological preparations show, can only be reached with a concentration of the sodium chloride content which is substantially higher than that obtainable in a paste prepared with bentonite.

The paste with a high concentration of the sodium chloride content also permits prevention of the fur due to Leptotrichae which sometimes form a continuous coating covering the teeth and which absorbs colors. Such coatings can only be removed with great difficulty by the dentist who has to use means which may attack the enamel. However the use of sodium chloride in high concentration prevents the formation of such layers and their spreading.

A further advantage of the tooth paste resides in the fact that a paste, manufactured under conditions producing sterility, remains free of microorganisms without further effort, if prepared with amorphous silica precipitated from the gaseous phase with a particle size within the limits above mentioned. The absorptive power of the substance is obviously sufficient to prevent the formation and growth of colonies of micro-organisms. When filled in a sterilized condition into tubes the paste remains sterilized even after long storage periods and can thus be distributed in a sterile condition to the consumers.

Among further advantages due to the use of amorphous silica is its biological character. The tooth paste essentially only contains substances of this character—the salt solution being likewise of a biological character—also normally forming part of the human body, a circumstance which in view of the constant use under conditions of normal health as well as under different pathological conditions must be rated as a not inconsiderable advantage.

The fact that the pH need not be specially adjusted is a further advantage not only from the above-mentioned standpoint of eliminating the non-biological substances necessary for such adjustment, but also from the standpoint of an easy manufacturing of the paste.

A further advantage of the amorphous silica consists in the fact that it is free of sulfur and other ions which derive from sulfuric and other acids used during precipitation from the liquid phase. Such ions may be disturbing in many ways, but even if not otherwise disturbing they act on the taste buds which are extremely sensitive and impart to the paste a disagreeable taste which has to be covered or counteracted. The silica when precipitated from a gaseous phase contains only chlorine ions which are present in the paste by virtue of its sodium chloride content and thus they do not produce an adverse effect.

The amorphous silica also functions as a polishing agent and in many cases is preferable to a granular abrasive in powder form which acts in a manner which may easily be too harsh for many types of teeth. The amorphous silica liquefies in the saliva which is produced in abundance by the tonic action of the sodium chloride and therefore, after use of the paste, no substance remains in the mouth, the particles of which may attack the enamel of the teeth or cause inflammation of the gingiva. The amorphous silica has nevertheless the effect of cleaning the teeth, especially from fatty residues. The polishing action is much milder than that of silica gel or that of finely ground calcium carbonate used either alone or in conjunction with bentonite. This is proved by the fact that calcium carbonate even if ground to a fine powder, in the course of years, wears down the metal, porcelain, and plastic material of dental caps, bridges and dentures. Tests show that the cleaning action of amorphous silica is as thorough as that performed by an abrasive, while abrasion, under identical conditions, is only ¼ of that produced by calcium carbonate and bentonite.

The tooth paste without calcium carbonate has the advantage that the content of sodium chloride in the paste may still be raised over that of a paste prepared with amorphous silica to which calcium carbonate has been added.

However, where an increased abrasive and polishing action is desired, calcium carbonate may be added to the paste without impairing the other basic advantages.

While the paste may consist exclusively of sodium chloride solution and the amorphous silica, it is of advantage in many cases to add a certain percentage of glycerine as such an addition produces a multiple effect. Glycerine keeps the salt in solution and in the event of evaporation of the water prevents recrystallization of the sodium chloride. It dissolves the tarry substances, deposited on the teeth of smokers and thus replaces the fatty material which had this function without lowering the surface tension. Its flavor covers the salt flavor which is sometimes disliked. It has an osmotic action of its own which adds itself to that of the sodium chloride and also on account of its hygroscopic properties it exercises a certain astingent effect on the gums.

The glycerine, according to the earlier patent above cited, is added to the sodium chloride solution. It is preferable in the case of the preparation of the paste according to the invention to add the glycerine to the paste already formed, the higher percentage of sodium chloride permitting this addition without any prejudicial effect.

When abrasive substances such as calcium carbonate, calcium triphosphate or similar substances, are added to the paste in the form of a fine powder, the glycerine in addition produces a stable bonding of the powdered abrasive.

On account of the extremely small particle size of the amorphous silica precipitate the tooth paste has a very smooth and homogeneous character. It is free of the disadvantage connected with many pastes to produce solidified residues after storage or to separate into layers of solids, fats, and liquids, due to partial or complete breakdown of the emulsion.

To prepare the tooth paste according to the invention, a marine salt solution is preferably used which still contains the additions to the basic compound and the trace elements to be found in salt produced from sea water. These additions and trace elements are found approximately in the same proportion in the body fluids and especially in the blood plasma and the biological adjustment of the materials coming into contact with the body tissues is thus more perfect.

The type of amorphous silica used has already been described. It is a precipitate from the gaseous phase with an average particle size which is smaller than the wave length of some visible light rays, the average size being between 4 and 120 millimicrons and the number of particles per gram being 1 to $12 \times 10^{15}$ with a calculated surface of around 150 to 300 m.$^2$ per gram, the above values being representative for the order within which the dimensions are found; they do not represent any fixed set of dimensions.

Silica of this type is mechanically mixed with the sodium chloride solution in such proportion that the final product has a sodium chloride content of 12.5 to 23%.

The variation in the sodium chloride content depends on one hand on the necessity of incorporating other materials, such as abrasives, as required for some types of paste and on the other hand on the use prescribed for the paste, pastes used extensively for therapy or massaging the gums having for instance a higher content in sodium chloride than pastes used prevalently for cleansing purposes.

The sodium chloride solution may first be heated to 212° F. in order to expel the air and in order to sterilize the solution and to destroy all microorganisms, before mixing with the amorphous silica.

If abrasives are to be added which are all in finely powdered form—calcium carbonate and calcium triphosphate being the most frequently used abrasives—they are preferably added to the amorphous silica and thoroughly mixed therewith before or while the silica is added to the sodium chloride solution.

Glycerine, frequently added to the tooth paste on account of its multiple advantages above mentioned, may be added to the sodium chloride before the preparation of the paste, but is preferably added to the mixture.

Under certain special circumstances the preparation of a tooth paste containing a fatty material, sometimes in conjunction with an abrasive is necessary. Such a fatty material consists usually of vaseline, of petrolatum or of paraffin oil or the like. An addition of this type is made during the mixing of the sodium chloride solution after it has cooled down to about 120° F.

Example 1

A tooth paste with the highest sodium chloride content is prepared solely with amorphous silica of the type above identified and a concentrated sodium chloride solution, containing about 25% of NaCl, by mechanical mixing as above described. Each 100 g. of the mixture contains:

|  | G. |
|---|---|
| Concentrated sodium chloride solution (25% NaCl) | 92.5 |
| Amorphous silica | 7.5 |

The NaCl content of the mixture is about 23%.

This paste is smooth and homogeneous and permanently free of microorganisms in sealed containers. Its homogeneity, consistence and sterility is unaffected by protracted storage.

Example 2

A paste is prepared in a manner similar to that in Example 1, but containing glycerine. Each 100 g. of the paste contains:

|  | G. |
|---|---|
| Concentrated sodium chloride solution (25% NaCl) | 80 |
| Amorphous silica | 10 |
| Glycerine | 10 |

This tooth paste has an NaCl content of 20%. It is a completely smooth and homogeneous paste. For greater protection against recrystallization and other reasons the glycerine may be increased to 15 g. and in exceptional cases even to 20 g., the amount of sodium chloride solution being reduced correspondingly, the NaCl content being still high (about 18%–19%). Storage or shipping at high temperatures may make such an increase necessary.

Example 3

The following compositions are example of pastes containing a small amount of fatty substances. They still have a markedly increased sodium chloride content but contain additions performing additional energetic cleaning actions, such as required for heavy smokers, etc. Each 100 g. contains:

|  | G. |
|---|---|
| Concentrated sodium chloride solution (25% NaCl) | 60 |
| Amorphous silica | 25 |
| Glycerine | 10 |
| Vaseline | 5 |

In the example Vaseline may be replaced by paraffin oil. The NaCl content of this paste is 15%.

Example 4

The tooth paste is prepared in the manner indicated in the preceding examples containing for each 100 g.:

|  | G. |
|---|---|
| Concentrated sodium chloride solution (25% NaCl) | 50 |
| Amorphous silica | 10 |
| Glycerine | 15 |
| Vaseline | 3 |
| Calcium carbonate | 22 |

Vaseline may be replaced by an equal amount of paraffin oil. Calcium carbonate may be replaced by an equal amount of calcium tri-phosphate. Vaseline may be entirely omitted and the sodium chloride may be increased correspondingly.

The tooth paste according to the invention is thus characterized by the fact that sodium chloride solution is held by adsorption on the amorphous silica, a small quantity of which holds a comparatively very large volume of the solution by virtue of its special character. This proportion of adsorbent and adsorbed material and the fact that the adsorbent itself exercises a cleaning action on the tissues maintaining at the same time the paste in a sterile condition distinguishes the paste according to the invention.

By virtue of the greatly increased content in sodium chloride which can be more than doubled, if necessary, in comparison with the paste described in the earlier Patent No. 2,658,851, the tooth paste has a therapeutic effect on the gingiva which extends beyond the marginal portions of the same and which may reach to subepithelial centers of inflammation and reach deeper layers than was hitherto possible.

This therapeutic effect is obtained in addition to the other advantages above explained.

It will be clear that changes of an unsuccessful nature may be made without in any way departing from the essence of the invention which will be understood by the expert on the basis of the foregoing description as consisting in the compositions and processes defined in the annexed claims.

Having described the invention, what is claimed is:

1. A toothpaste composition consisting essentially of about 25 percent by weight aqueous sodium chloride solution absorbed on an amorphous particulate silica aerogel carrier, said silica carrier having been precipitated from the gaseous phase as particles averaging between 4 and 120 millimicrons in diameter having from $1 \times 10^{15}$ to $12 \times 10^{15}$ particles and an active surface area from 150 to 300 square meters per gram, said composition containing from 12.5 to 23 percent by weight of sodium chloride based on the total weight of the toothpaste composition.

2. The composition according to claim 1 containing 10 to 20 percent by weight of glycerine added thereto.

3. The composition according to claim 1 with calcium carbonate added thereto.

4. A toothpaste composition consisting essentially of 92.5 parts of 25 percent aqueous sodium chloride and 7.5 parts of an amorphous particulate silica aerogel carrier, said silica carrier having been precipitated from the gaseous phase as particles averaging between 4 and 120 millimicrons in diameter having from $1 \times 10^{15}$ to $12 \times 10^{15}$ particles and an active surface area from 150 to 300 meters per gram.

5. A toothpaste composition consisting essentially of 80 parts of 25 percent aqueous sodium chloride, 10 parts glycerine and 10 parts of an amorphous particulate silica aerogel carrier, said silica carrier having been precipitated from the gaseous phase as particles averaging between 4 and 120 millimicrons having from $1 \times 10^{15}$ to $12 \times 10^{15}$ particles and an active surface area from 150 to 300 square meters per gram.

References Cited in the file of this patent

UNITED STATES PATENTS

| | | |
|---|---|---|
| 2,059,396 | Ripert | Nov. 3, 1936 |
| 2,089,531 | Bergve | Aug. 10, 1937 |
| 2,428,178 | Reik et al. | Sept. 30, 1947 |
| 2,658,851 | Brandenberger et al. | Nov. 10, 1953 |
| 2,819,151 | Flemmert | Jan. 7, 1958 |

FOREIGN PATENTS

| | | |
|---|---|---|
| 347,377 | Great Britain | Apr. 30, 1931 |
| 627,527 | Great Britain | Aug. 10, 1947 |